United States Patent [19]
Black et al.

[11] Patent Number: 5,530,825
[45] Date of Patent: Jun. 25, 1996

[54] DATA PROCESSOR WITH BRANCH TARGET ADDRESS CACHE AND METHOD OF OPERATION

[75] Inventors: Bryan P. Black; Marvin A. Denman, both of Austin, Tex.

[73] Assignee: Motorola, Inc., Schaumburg, Ill.

[21] Appl. No.: 228,469

[22] Filed: Apr. 15, 1994

[51] Int. Cl.⁶ ................................................. G06F 9/32
[52] U.S. Cl. ..................................... 395/421.03; 395/375
[58] Field of Search ............................. 395/375, 445, 395/421.03

[56] References Cited

U.S. PATENT DOCUMENTS

5,142,634  8/1992  Fite et al. ................................. 395/375

Primary Examiner—Jack A. Lane
Attorney, Agent, or Firm—Lee E. Chastain

[57] ABSTRACT

A data processor (10) has a BTAC (48) storing a number of recently encountered fetch address-target address pairs. Each pair also includes an offset tag identifying which one of a plurality of instructions indexed by the fetch address generated the entry. A branch unit (20) generates an execution address that depends upon one of the plurality of instructions. After executing each instruction, the branch unit may delete an entry from the BTAC if the instruction's execution address differs from the target address and if the instruction is the same instruction which generated the BTAC entry initially.

4 Claims, 6 Drawing Sheets

EXAMPLE 1

| INSTRUCTION | PREVIOUSLY PREDICTED | OFFSET | DECODED OFFSET | EXECUTE | PREDICTED NEXT TIME | BTAC ACTION |
|---|---|---|---|---|---|---|
| 1. BRANCH 1 | NOT TAKEN | 10 | 0 | NOT TAKEN | NOT TAKEN | DO NOT DELETE |
| 2. ADD | N/A | 10 | 0 | N/A | N/A | NONE |
| 3. BRANCH 2 | TAKEN | 10 | 1 | TAKEN | TAKEN | ADD TO BTAC |
| 4. LOAD | N/A | 10 | 0 | N/A | N/A | NONE |

FIG.6

EXAMPLE 2

| INSTRUCTION | PREVIOUSLY PREDICTED | OFFSET | DECODED OFFSET | EXECUTE | PREDICTED NEXT TIME | BTAC ACTION |
|---|---|---|---|---|---|---|
| 1. BRANCH 3 | TAKEN | 00 | 1 | NOT TAKEN | TAKEN | ADD TO BTAC |
| 2. SUBTRACT | N/A | 00 | 0 | – | – | – |
| 3. BRANCH 4 | NOT TAKEN | 00 | 0 | – | – | – |
| 4. STORE | N/A | 00 | 0 | – | – | – |

*FIG. 7*

EXAMPLE 2 CONTINUED

| INSTRUCTION | PREVIOUSLY PREDICTED | OFFSET | DECODED OFFSET | EXECUTE | PREDICTED NEXT TIME | BTAC ACTION |
|---|---|---|---|---|---|---|
| 1. BRANCH 3 | TAKEN | 00 | 0 | – | – | – |
| 2. SUBTRACT | N/A | 00 | 0 | N/A | N/A | NONE |
| 3. BRANCH 4 | NOT TAKEN | 00 | 0 | NOT TAKEN | NOT TAKEN | DO NOT DELETE |
| 4. STORE | N/A | 00 | 0 | N/A | N/A | NONE |

*FIG. 8*

DATA PROCESSOR WITH BRANCH TARGET ADDRESS CACHE AND METHOD OF OPERATION

RELATED APPLICATION

The present invention is related by subject matter to two patent applications entitled "Data Processor with Branch Prediction and Method of Operation," Ser. No. 08/192,292, and "Dam Processor with Branch Target Address Cache and Method of Operation," Ser. No. 08/191,888, both to Bryan Black et al., filed Feb. 4, 1994.

FIELD OF THE INVENTION

The present invention generally relates to digital computing systems, and more specifically to a data processor with branch prediction capabilities.

BACKGROUND OF THE INVENTION

Branch prediction is one technique used to improve data processor performance. If the operands on which a branch instruction depends are not available, then a dam processor must either predict the outcome of the branch instruction or must stall the branch instruction until the operands are available. If the data processor stalls, or delays executing the branch instruction, then it can not determine what instructions it needs next. Such a delay will significantly impact the performance of the data processor.

Data processors that use branch prediction techniques make a "guess" each time they receive a branch instruction, act on the guess, and then determine if the guess was correct by executing the instruction. Such a data processor guesses whether a branch will ultimately be taken and "jump" to a new instruction address or whether it will "fall through" to the next sequential instruction. Data processors that predict branch instructions gain performance because they can make an accurate guess faster than they can fully execute the branch instruction. These data processors then need only correct wrong guesses.

Branch target address caches ("BTACs") are devices used to make branch predictions. BTACs contain addresses to which the data processor has recently branched. These "branch targets" are indexed by the address of the branch instruction which generated them. The data processor will search the BTAC once it determines the address of any instruction that it should next execute. If the address corresponds to a valid entry in the BTAC, then the data processor assumes that it will take the branch again and will automatically branch to the corresponding cached target address. If the address does not correspond to any valid entry in the BTAC, then the data processor will determine the address of its next instruction by some other method.

A data processor incorporating a BTAC updates its BTAC after it executes each branch instruction and determines a target address. Known data processors then store the address of the branch instruction and its target address in the BTAC. Some data processors only store address-target address pairs of branch instructions that are taken. Those that are not taken are either not stored in the BTAC or are deleted if they are already stored in the BTAC. This methodology minimizes the size of the BTAC since the not-taken or sequential address is easily determined.

A BTAC's storage algorithm can degrade the performance of a data processor incorporating the BTAC if each entry in the BTAC is associated with more than one instruction. A single BTAC entry may be associated with more than one instruction to reduce BTAC look-up time and size. In of these cases, two or more different branch instructions may be associated with the, same BTAC entry depending upon the programmed instruction stream. However, these two different branch instructions may have different target address and may or may not be taken independently of each other.

SUMMARY OF THE INVENTION

In accordance with the present invention, there is disclosed a data processor having a branch address target address cache unit which substantially eliminates disadvantages of known data processors.

A data processor has branch target address cache and a branch unit coupled together. The branch target address cache stores a plurality of sets. Each one of the plurality of sets has a fetch address, a target address, and an offset tag. The fetch address and the offset tag identify a first memory location of a first branch instruction. The branch target address cache outputs a target address and an offset tag of a selected one of the plurality of sets if the fetch address of the selected one of the plurality of sets is logically equivalent to a first subset of an input address. The input address indexes a plurality of instructions. The branch unit generates an execution fetch address responsive to one of the plurality of instructions. The one, of the plurality of instructions is associated with a second memory location. The branch unit deletes the selected one of the plurality of sets if the first and second memory locations are logically equivalent.

A method of operating a data processor is also described. During a first time period, the method has the steps of receiving an input address of a first plurality of instructions in a branch target address cache, and outputting a target address and an offset tag from the branch target address cache. The output target address and offset tag are one of a plurality of sets, each set also having a fetch address. The fetch address of the output target address is logically equivalent to a first subset of the input address. During a second time period, the method has the steps of receiving one of the plurality of instructions in a branch unit coupled to the branch target address cache, generating an execution fetch address and deleting the selected one of the plurality of sets if a memory location of the one of the plurality of instructions is logically equivalent to the first memory location.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
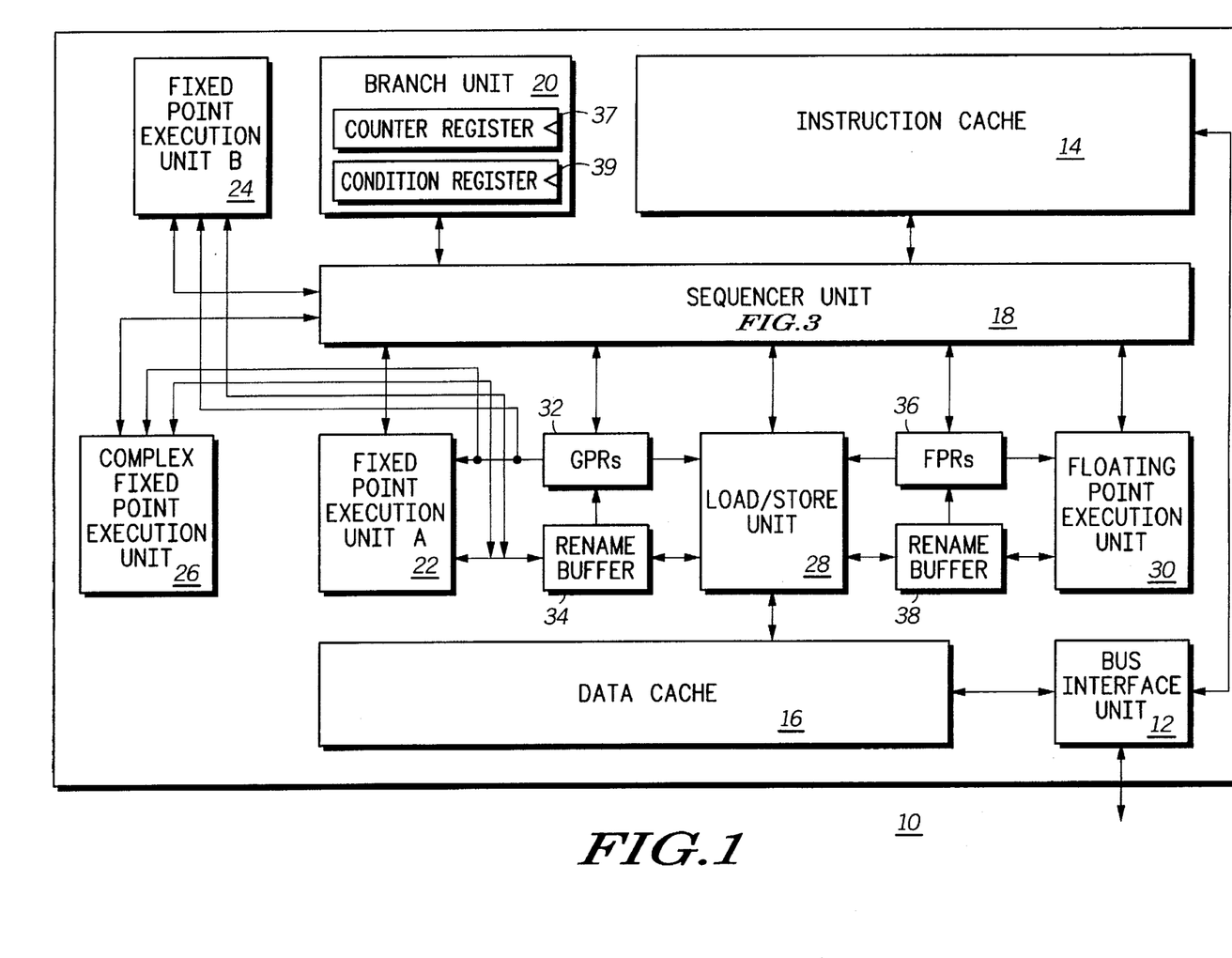
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by predicting whether each branch instruction will be taken or will not be taken. Data processor 10 then fetches instructions at the predicted fetch address (a "target address") and begins executing these instructions. Later, data processor 10 resolves whether the branch should have been taken or should not have been taken and performs corrective measures if it predicted incorrectly at the earlier time. Data processor 10 incorporates a branch target address cache ("BTAC") to store a plurality of sets of fetch address-target address pairs. Each one of the plurality of sets stores one target address associated with four instructions. Data processor 10 searches the BTAC each time it generates a new fetch address. If the fetch address is present in the BTAC, then data processor 10 will immediately begin fetching instructions at the target address associated with the stored fetch address. After resolving each branch instruction, data processor 10 either adds or deletes the fetch address-target address pair indexed by the particular branch instruction.

According to the disclosed invention, data processor 10 adds the branch address-target address pair to the BTAC if the branch instruction is resolved as taken (or predicted "to be taken next time"). Conversely, data processor 10 deletes the branch address-target address pair from the BTAC if the branch instruction is resolved as not taken (or predicted "not to be taken next time") and the particular branch instruction was the branch instruction that generated the stored target address. Each one of the plurality of sets also stores a tag identifying which one of the four possible instructions generated the corresponding target address. Data processor 10 does nothing to the BTAC if the branch instruction is resolved as not taken (or predicted "not to be taken next time") and the particular branch instruction was not the branch instruction that generated the stored target address. This methodology improves the accuracy of each branch prediction, reduces the number of "bubbles" in the instruction stream, and generally improves the performance of data processor 10.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 is more fully described below in connection with FIG. 3. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and here:after FPR file) and to a second rename buffer 38.

The operation of data processor 10 without the disclosed branch prediction methodology is known in the art. In general, branch unit 20 determines what sequence of programmed instructions is appropriate given the contents of certain data registers and the instructions themselves. Two such registers which branch unit 20 uses to predict branch instructions are a counter register 37 and a condition register 39. Branch unit 20 is described below in connection with FIGS. 4 and 5. Instruction cache 14 provides this sequence of programmed instructions to sequencer 18. If instruction cache 14 does not contain the required instructions, then it will fetch them from a main memory system external to data processor 10 (not shown). (As described below, sequencer unit 18 makes several predictions for each branch instruction before branch unit 20 finally resolves a particular branch instruction.)

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance,, fixed point execution units A and B, 22 and 24, perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B, 22 and 24, and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B, 22 and 24, and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via B IU 12.

The operation of data processor 10 with the disclosed branch prediction methodology is described below in connection with FIGS. 2 through 5. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipelining."

Figure 2:
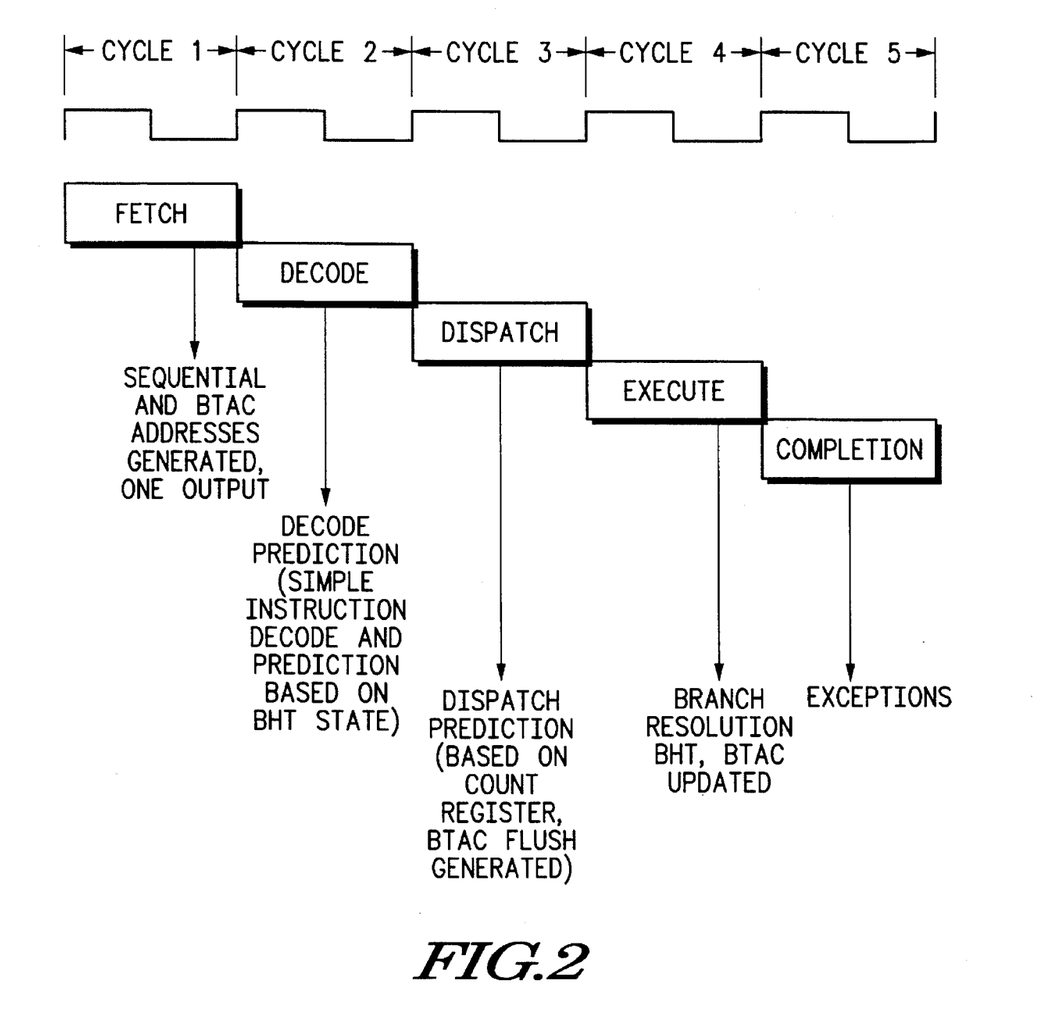
FIG. 2 depicts a timing diagram of an instruction executed by the data processor depicted in FIG. 1.

FIG. 2 depicts a timing diagram of an instruction executed by data processor 10 depicted in FIG. 1. FIG. 2 also includes various annotations describing the timing of certain branch instruction features. In the depicted embodiment, each instruction is broken into five discrete steps: fetch, decode, dispatch, execute, and completion.

In the fetch stage, the instruction cache 14 retrieves one or more instructions beginning at a memory address identified by sequencer unit 18 or by branch unit 20 in the prior clock cycle. This memory address is called the fetch address. Sequencer unit 18 makes a first branch prediction in the fetch pipeline stage. Sequencer unit 18 uses a BTAC to store a number of pairs of fetch addresses and their corresponding target addresses for a number of recent branch instructions. Sequencer unit 18 will fetch instructions at a particular target address stored in the BTAC if its input fetch address corresponds to the fetch address of the particular target address.

In the decode stage, instructions are decoded by the sequencer unit 18 into a number of control signals for use by subsequent stages. Sequencer unit 18 makes a second branch prediction in the decode pipeline stage. Sequencer unit 18 may generate a fetch address for one or more simple branch instructions. Sequencer unit 18 maintains a history state for each recently encountered branch instruction in a branch history table ("BHT"). The state of each branch instruction determines if sequencer unit 18 will predict the branch instruction taken or not taken.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched. Sequencer unit 18 makes a third branch prediction in the dispatch pipeline stage. Sequencer unit 18 may generate a fetch address for one or more branch instructions that depend upon the value of counter register 37. It is during the dispatch stage that sequencer unit 18 determines if any "phantom branch instructions" occurred. A phantom branch instruction is an instruction that hit in BTAC 46 but was not actually a branch instruction. Phantom branch instructions are likely to occur after data processor 10 begins executing a new instruction stream, a "context switch." After a context switch, instructions are remapped from a first addressing scheme to a second addressing scheme. In these cases, a new non-branch instruction may have the same address as an old branch instruction and erroneously hit in the BTAC. If a phantom branch instruction does occur, then sequencer unit 18 invalidates the contents of its BTAC.

In the execute stage, each particular execution unit executes its programmed instruction. Results, if any, are returned either to rename buffer 34 or rename buffer 38, respectively, for integer and floating point results. The contents of counter register 37 and condition register 39 are available at the execute stage for final resolution of all branches. Therefore, the fetch address generated by branch unit 20 in the execute phase is not a prediction.

In lube completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 3:
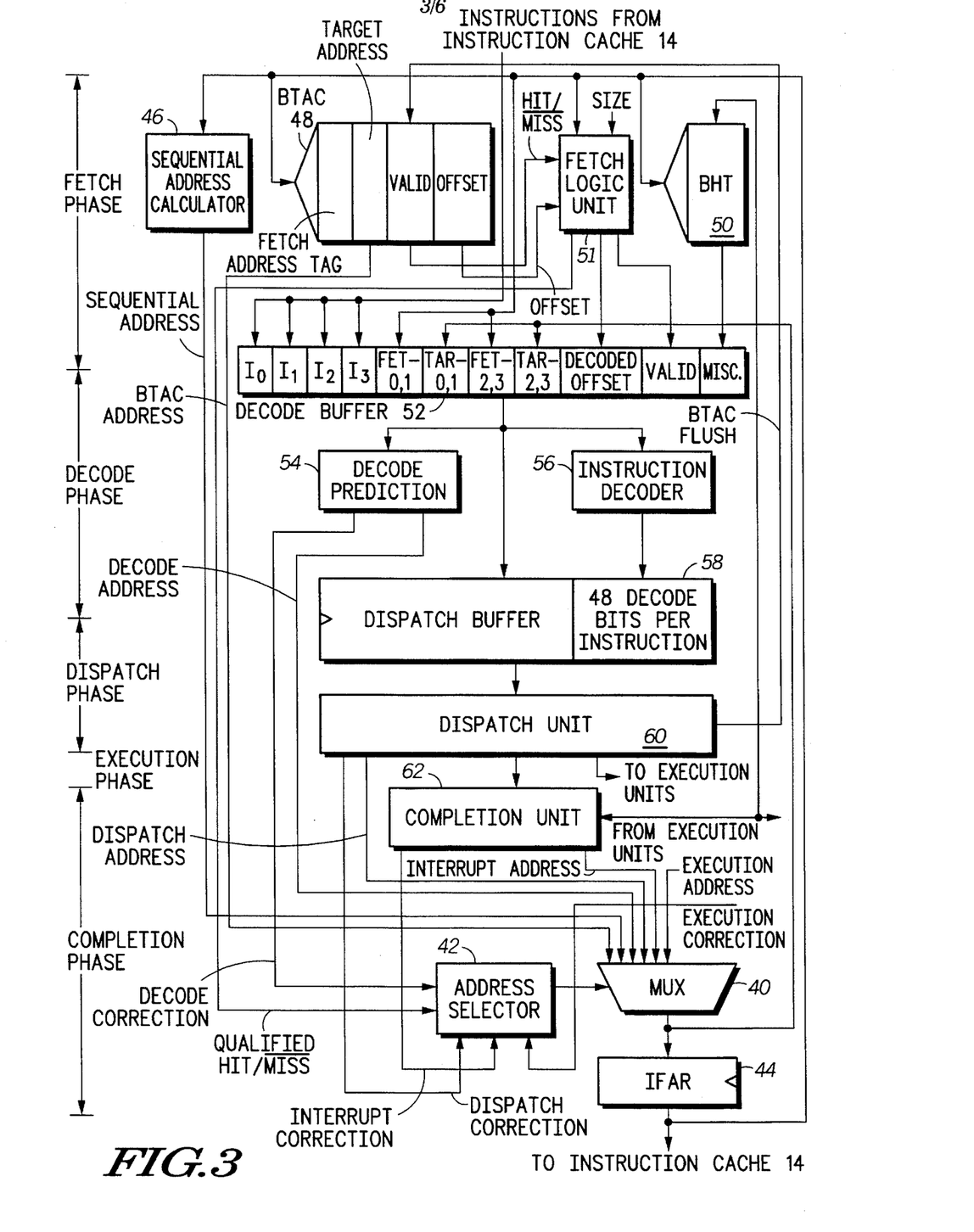
FIG. 3 depicts a block diagram of the sequencer unit depicted in FIG. 1.

FIG. 3 depicts a block diagram of sequencer unit 18 depicted in FIG. 1. Multiplexer 40 selects a new fetch address each clock cycle from several sources. An address selector 42 selects one of the several sources as the output of multiplexer 40 according to a priority scheme described below. The fetch address is a virtual address that identifies the location of the next instruction or group of instructions that dam processor 10 should execute. The fetch address is latched by an instruction fetch address register (labeled and hereafter IFAR) 44 and forwarded to instruction cache 14. In the depicted embodiment, sequencer 18 and branch unit 20 generate a fetch address during each one of the five pipeline stages. It should be noted that each of the (up to) four fetch addresses generated by a particular branch instruction and the return of the exception address will occur at different stages in the pipeline. Conversely, two or more closely spaced branch instruction may cause sequencer 18 and branch unit 20 to forward two different fetch addresses to multiplexer 40 at the same time. In this second case, address selector 42 will choose the fetch address generated in the later pipeline stage.

Sequencer 18 may be conveniently divided into five portions analogous to the five pipeline stages of data processor 10. (The execution portion of data processor 10 is embodied by the six execution units depicted in FIG. 1.)

In the fetch stage, the virtual address in IFAR 44 is forwarded to a sequential address calculator 46, a BTAC 48, a BHT 50, and a decode buffer 52.

Sequential address calculator 46 generates a fetch address and forwards it to multiplexer 40, "SEQUENTIAL ADDRESS." Sequential address calculator 46 generates the sequential fetch address by adding the number of instructions fetched in the current machine cycle to the contents of IFAR 44.

BTAC 48 may generate a fetch address, "BTAC ADDRESS," and, if so, forwards it to multiplexer 40. BTAC 48 is a fully associative content addressable memory ("CAM")-static random access memory ("SRAM") array. BTAC 48 stores a plurality of sets. Each one of the sets contains a twenty-nine bit fetch address tag, a thirty bit target address, a valid bit, and a two bit offset tag identifying which of the four instructions located at the fetch address generated the corresponding target address. BTAC 48 compares the twenty-nine most significant bits of the current fetch address to each stored tag. If the fetch address bits match a stored valid fetch address tag, then BTAC 48 outputs the corresponding stored target address to multiplexer 40. In this case, BTAC 48 also asserts a control signal HIT /$\overline{\text{MISS}}$.

Figure 4:
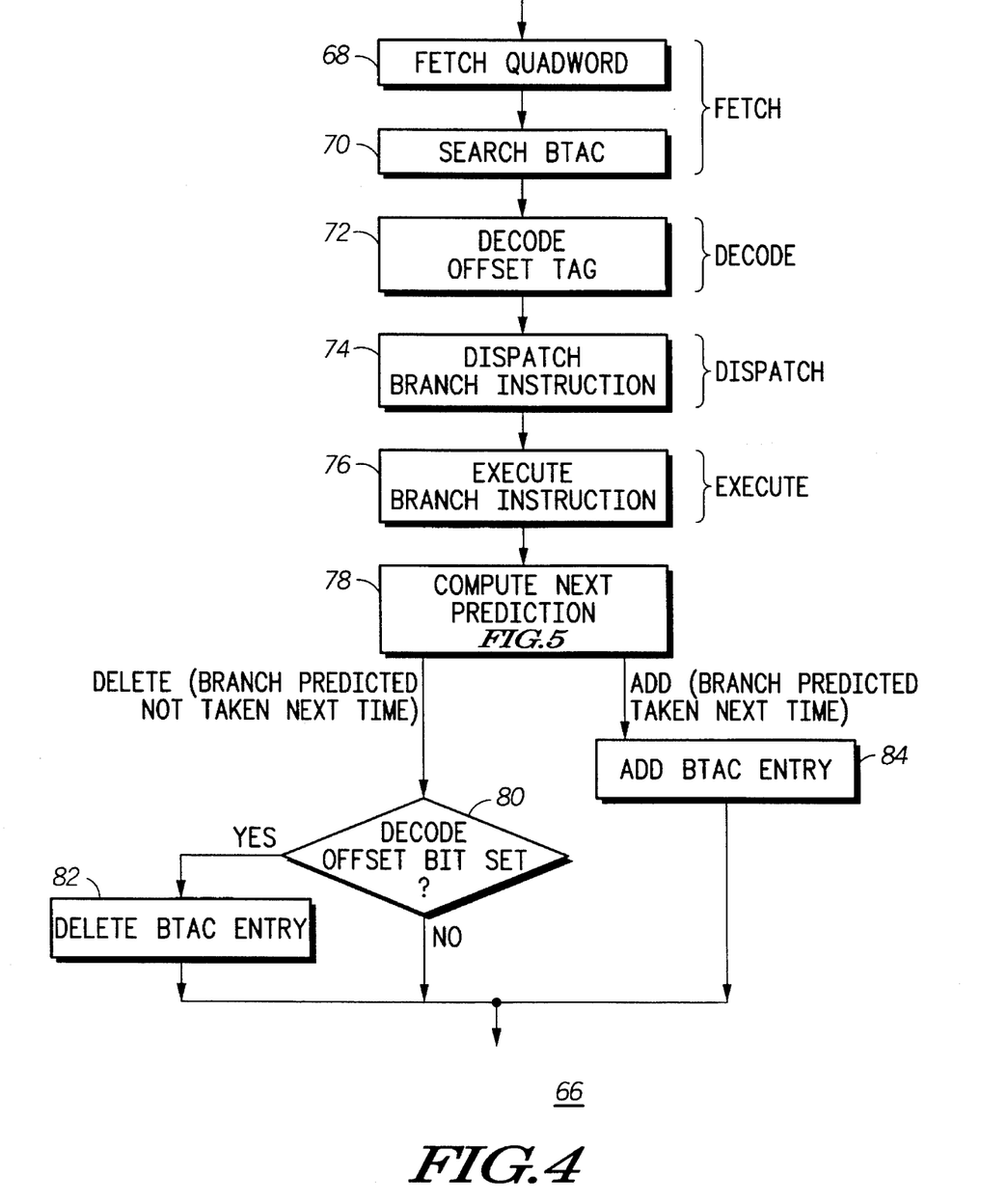
FIG. 4 depicts a flow diagram illustrating how the branch unit depicted in FIG. 1 updates the branch target address cache.
Figure 5:
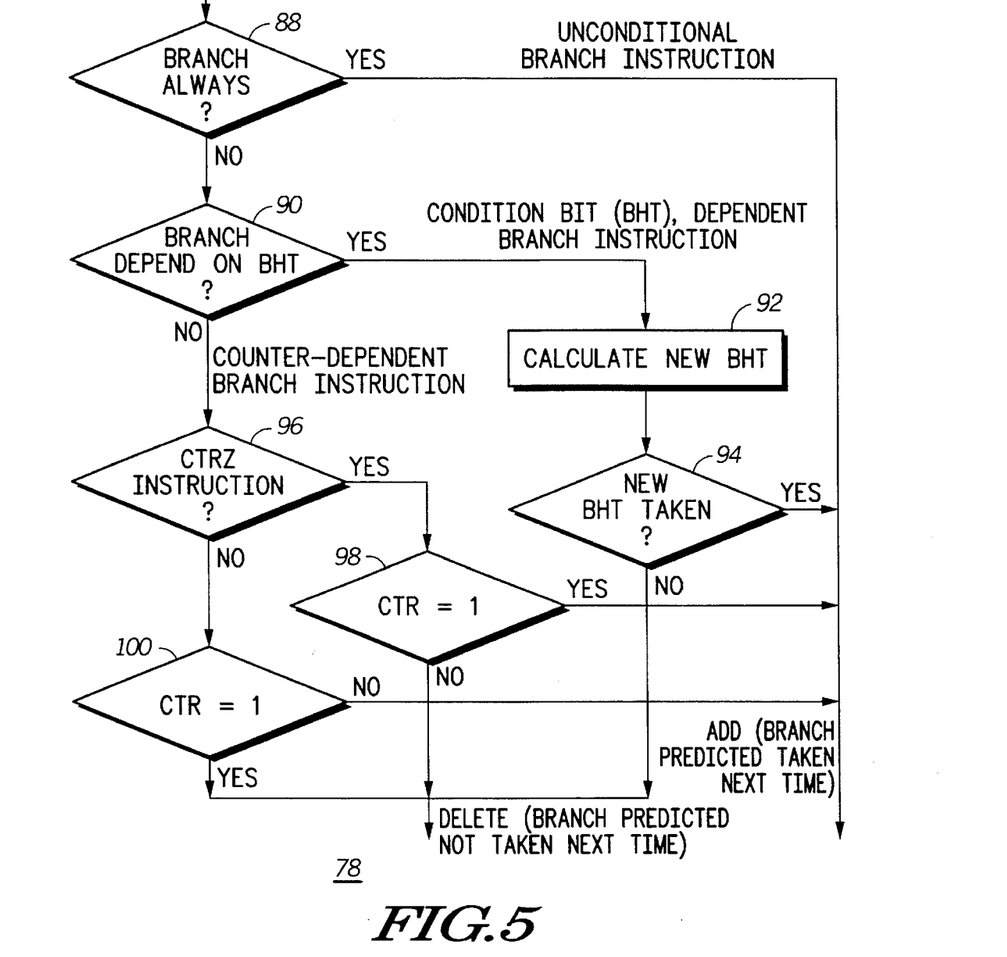
FIG. 5 depicts a flow diagram of one step depicted in FIG. 4.

Branch unit 20 adds, deletes and updates entries to BTAC 48 during each execution stage. If branch unit 20 indicates that an entry is to be added (branch taken or predicted taken), BTAC 48 is searched. If the entry is already in BTAC 48, then its address information is updated. This is useful because branches that use a register for their branch target information may have, incorrect information in BTAC 48. If the entry is not in BTAC 48, then branch unit 20 adds it to BTAC 48, replacing another entry. If the branch unit 20 indicates that an entry is to be deleted (branch not taken or predicted not taken), then BTAC 48 is searched and the matching entry (if any) is invalidated. BTAC 48 has two read ports and one write port to facilitate these execution stage operations and the fetch stage operations described above. FIGS. 4 and 5 depict how branch unit 20 updates BTAC 48 and BHT 50.

A fetch logic unit 51 receives the output of IFAR 44, the control signal HIT/$\overline{\text{MISS}}$, a control signal SIZE from instruction cache 14, and the two offset bits of the selected BTAC set. Fetch logic unit 51 asserts the control signal QUALIFIED HIT /$\overline{\text{MISS}}$ if BTAC 48 hits on a fetched instruction. Fetch logic unit 51 also sets each of the four DECODED OFFSET and VALID bits in decode buffer 52.

Fetch logic unit 51 asserts the control signal QUALIFIED HIT/$\overline{\text{MISS}}$ if two conditions are met: (1) BTAC 48 asserts the control signal HIT/$\overline{\text{MISS}}$, and (2) the matching set's two OFFSET bits are within the range of the fetched instructions. Fetch logic unit 51 must determine if the OFFSET bits are within the range of the fetched addresses because instruction cache 14 returns instructions in double word aligned pairs (three least significant bits ("LSBs") of the address contain zeros). Instruction cache 14 always returns the aligned double word indicated by the fetch address. Also, instruction cache 14 returns the next sequential double word so long as the next sequential double word is within the same aligned double-quad word (five LSBs contain zeros). Therefore, the first instruction is not within the range of the fetched address if the LSB of the word aligned fetch address is one (points to second instruction in the pair). Otherwise, the first instruction is within the range of the fetched address. The second instruction is always within the range of the fetched address. The third and fourth instructions, if returned, are also always within the range of fetched instructions.

Fetch logic unit 51 sets each of the four DECODED OFFSET and four VALID bits in decode buffer 52. Fetch logic unit 51 sets each decoded, offset bit to zero if BTAC 48 does not assert HIT /$\overline{\text{MISS}}$. Fetch logic unit 51 may set one decoded offset bit to one if BTAC 48 asserts HIT/$\overline{\text{MISS}}$ under certain circumstances. Fetch logic unit 51 will set the decoded, offset bit of a particular instruction if the instruction's address indicates that it is the same instruction that generated the BTAC entry. The two OFFSET bits indicate the number of instructions between the first instruction indexed by the fetch address tag and the branch instruction that originally generated the BTAC entry. Therefore, fetch logic unit 51 sets the decoded offset bit of the particular instruction if the two fetch addresses match (a BTAC hit), and if the particular instruction's offset matches the offset field. (Other address comparison algorithms may be used to determine, if the fetched instruction is the same as the original branch instructions.) Instructions returned from instruction cache 14 within the range of the fetch address are "valid" instructions.

BHT 50 is a direct mapped random access memory ("RAM") array that maintains a two-bit branch history state for 512 recently encountered branch instructions. Each entry contains two bits to encode four possible states. BHT 50 is indexed with a subset of the fetch address bits from IFAR 44. The latest value of the entry which the current fetch address maps to is read out of BHT 50 and latched in decode buffer 52. Branch unit 20 updates each entry of BHT 50 in the execution stage as described below. BHT 50 has one read port and one write port to facilitate these execution stage operations and the fetch stage operations described above.

Data processor 10 uses a dynamic branch prediction methodology to predict branch instructions which are based on the value of one or more bits in condition register 39. In the PowerPC Architecture, other instructions may modify the bits of condition register 39 as a prelude to executing a branch instruction. According to a dynamic branch prediction methodology, branch instructions are more likely to be taken or not be taken if previous occurrences of the same branch instructions have been taken or not taken, respectively. Therefore, it is possible to predict whether a branch instruction will be taken or will not be taken by maintaining the history of each branch instruction. The state of a particular branch instruction determines if the branch will be predicted taken or will be predicted not taken during the decode stage of the particular branch instruction. The branch state model for the depicted embodiment is a four-state model: STRONG-NOT-TAKEN, WEAK-NOT-TAKEN, WEAK-TAKEN and STRONG-TAKEN. Sequencer 18 predicts that a branch will not be taken if the instruction's branch state corresponds to STRONG-NOT-TAKEN or WEAK-NOT-TAKEN. Sequencer 18 predicts that a branch will be taken if the instruction's branch state corresponds to STRONG-TAKEN or WEAK-TAKEN. Branch unit 20 updates the state of each entry in BHT 50. Branch unit 20 uses information about the current state of the BHT entry and the direction of an executing branch to calculate the next state of the BHT entry which corresponds to the executing; branch instruction. If sequencer 18 incorrectly predicted the branch instruction, then branch unit 20 will update the corresponding entry in BHT 50 from one strong state to the same weak state or from one weak state to the opposite weak state. Conversely, if sequencer unit 18 correctly predicted the branch instruction, then branch unit 20 will update the corresponding entry in BHT 50 from one weak state to the same strong state or from one strong state to the same strong state.

Decode buffer 52 stores four fetched instructions ($1_0$ through $1_3$) and, for each instruction, its fetch address, a target address, a decoded offset bit, a valid bit and miscellaneous other bits (labeled "MISC."). In the depicted embodiment, data processor 10 fetches zero, two or four instructions each clock cycle depending upon how many instructions it was able to dispatch the previous cycle. Therefore, a fetch address (labeled FET-0,1 and FET-2,3) and a target address (labeled TAR-0,1 and TAR-2,3) need only be maintained for each pair of instructions. The output of IFAR 44 generates the fetch address or "NEXT" address (the output of multiplexer 40 during the previous cycle). The output of multiplexer 40 generates the target address (either the output of sequential address calculator 46 or some other fetch address correction). The decoded offset bit identifies which, if any, of the four instructions has a target address stored in BTAC 48.

In the decode stage, decode buffer 52 provides instructions, addresses, and control information to a decode prediction unit 54. Decode buffer 52 provides instructions to an instruction decoder 56. A dispatch buffer 58 latches instructions, addresses, and control information from decode buffer 52 and instruction decode information from instruction decoder 56. Decode prediction unit 54 provides a decode stage fetch address to multiplexer 40, "DECODE ADDRESS." Decode prediction unit 54 predicts unconditional branch instructions and predicts branch instructions based on one or more bits in condition register 39. Decode prediction unit 54 predicts unconditional branch instructions by decoding their existence and determining the appropriate fetch address responsive to the branch instruction. Decode prediction unit 54 predicts branch instructions based on one or more bits in condition register 39 by decoding the contents of BHT 50. As described above, the entry in BHT 50 corresponding to the fetch address of the decoded branch instruction determines if the branch instruction is taken or not taken. The branch instruction itself determines the target address.

In the dispatch stage, dispatch buffer 58 supplies instructions and control information to a dispatch unit 60. Dispatch unit 60 does resource allocation and conflict checking for those instructions and sends instructions and control information to the proper execution unit if possible. Dispatch unit 60 also sends control information to a completion unit 62.

Dispatch unit 60 provides a fetch address to multiplexer 40, "DISPATCH ADDRESS." Dispatch unit 60 predicts branch instructions based on an early value of counter register 37. It should be noted that branch unit 20 resolves each branch instruction using the value of counter register 37 at the execution stage. In the PowerPC Architecture, counter register 37 may be conveniently loaded with a value representing the number of iterations of a loop and may be decremented each iteration to provide a loop exit condition. Dispatch unit 60 predicts whether the branch should be taken or not taken depending upon the particular branch instruction opcode (branch if counter register equals zero, etc.) in view of the value of counter register 37 during the dispatch stage. Branches which use a combination of counter register 37 and condition register 39 are predicted in the dispatch stage. Dispatch unit 60 predicts these branch instructions by assuming that the condition specified by condition register 39 is met and by using the value of counter register 37 during the dispatch stage.

Dispatch unit 60 asserts a BTAC FLUSH control signal to BTAC 48 if it determines that sequencer 18 encountered a phantom branch. Dispatch unit 60 will assert BTAC FLUSH when control information indicates that a particular instruction had a predicted target in BTAC 48 (fetch logic unit 51 asserted QUALIFIED HIT/MISS), but the particular instruction is not a branch instruction. Asserting BTAC FLUSH will invalidate all entries in BTAC 48. Dispatch unit 60 then outputs the phantom branch instruction's sequential address to multiplexer 40 via DISPATCH ADDRESS. (Dispatch unit 60 increments the instruction's fetch address.) Dispatch unit 60 invalidates BTAC 48 because the BTAC entries were likely from a previous context and therefore are no longer useful. Each time a "phantom branch" occurs, sequencer unit 18 wastes several cycles fetching instructions along the phantom path. A BTAC flush prevents this and many other "phantom branches" in the near future.

At the beginning of the execute stage of a branch instruction, branch unit 20 knows the actual value of the branch condition on which the fetch address is based. Typically this condition is some combination of the value of counter register 37 and a bit in condition register 39. At this time final resolution can occur for all branches. Branch unit 20 supplies a fetch address to multiplexer 40 reflecting its calculations, "EXECUTION ADDRESS." The various execution units supply a variety of control information to a completion unit 62 during the execute stage.

In the completion stage, a completion unit 62 updates the architectural machine state. Completion unit 62 provides a fetch address, "INTERRUPT ADDRESS," in the event of an interrupt from some execution unit. Completion unit 62 outputs the INTERRUPT ADDRESS when an instruction that has an interrupt condition is ready to complete. After the interrupt is handled by software, a return from interrupt will typically be executed to resume execution with the instruction following the one which caused the interrupt condition. Completion unit 62 also provides control signals to update architectural state in itself and the execution units. For branch instructions, this step updates the architectural program counter, and counter register 37.

Address selector 42 determines which of up to six addresses it should cause multiplexer 40 to output to IFAR 44. Address selector 42 receives the control signal QUALIFIED HIT/MISS from fetch logic unit 51, a control signal DECODE CORRECTION from decode prediction unit 54, a control signal DISPATCH CORRECTION from dispatch unit 60, a control signal EXECUTION CORRECTION from branch unit 20 and a control signal INTERRUPT from completion unit 62. The source of each control signal asserts its control signal if the source generates a fetch address different from the fetch address generated during the prior pipeline stage, a corrected fetch address. In general, each stage of the pipeline either resolves a branch or makes a statistically more accurate prediction of the branch direction than the previous stage or stages. Therefore, the later stages in the pipeline have priority over the earlier stages for correction. In the case of the fetch stage, the output of BTAC 48 has priority over the output of the sequential address calculator 46. Each subsequent fetch address correction invalidates all instructions following the corresponding branch instruction in the pipeline. For example if branch unit 20 corrects a prior fetch address, then the decode stage fetch address (of an immediately following branch instruction) is irrelevant. In this case, the decode stage fetch address is based on a branch instruction that should not have been fetched.

FIG. 4 depicts a flow diagram 66 illustrating how branch unit 20 depicted in FIG. 1 updates BTAC 48. According to the PowerPC Architecture, branch unit 20 executes four different classes of branch instructions: branch unconditional, branch conditional based on condition register 39, branch conditional based on a counter register 37, and branch conditional based on a counter register 37 and on condition register 39. Unconditional branch instructions are predicted (resolved) based on their decode during the decode stage. Conditional branch instructions based on condition register 39 are predicted during the decode stage using history bits from BHT 50. Conditional branch instructions based on counter register 37 and conditional branch instructions based on the combination of counter register 37 and condition register 39 are predicted during the dispatch stage. These latter instructions use the decremented value of the counter register 37 and assume any condition register 39 condition is met.

Continuing with FIG. 4, sequencer unit 18 fetches (up to) four instructions (a quad word) each clock cycle, a step 68. Sequencer unit 18 then searches BTAC 48 for a matching fetch address-target address pair indexed by the quad word's fetch address as described above, a step 70. Sequencer unit 18 decodes the two bit OFFSET tag into four decoded offset bits, a step 72. Sequencer unit 18 dispatches the branch instruction to branch unit 20, a step 74.

Branch unit 20 calculates a new fetch address for each branch instruction it executes, a step 76. Branch unit 20 resolves whether it should continue along the same instruction path (branch not taken) or whether it should jump to a new instruction stream (branch taken) depending upon the branch instruction opcode and the contents of counter register 37 and condition register 39. Branch unit 20 calculates the branch taken fetch address according to the addressing format of the branch instruction.

Branch unit 20 executes whether it will take each branch or not according to a condition precedent as defined in the opcode of each branch instruction: branch unconditionally, branch if counter register 37 equals zero, branch if counter register 37 does not equal zero, branch if condition register 39 is true, branch if condition register 39 is false, branch if condition register 39 is true and counter register 37 equals zero, branch if condition register 39 is false and counter register 37 equals zero, branch if condition register 39 is true and counter register 37 does not equal zero, or branch if condition register 39 is false and counter register 37 does not equal zero.

Branch unit 20 outputs one of five different addresses for the new fetch address: a sequential address, an absolute target address, an offset target address, the contents of counter register 37, or the contents of a link register (not shown). Branch unit 20 calculates the sequential address by adding the, instruction word size and the address of the branch instruction. The address of the branch instruction is the instruction's fetch address plus its offset within the fetched group of instructions. Branch unit 20 calculates the absolute target address by concatenating six zeros, an embedded operand in the branch instruction, and two zeros (most significant bit to least significant bit). Branch unit 20 calculates the offset target address by adding the embedded operand and the branch target address. Branch unit 20 selects the sequential address if the branch is resolved as not-taken. Branch unit 20 selects one of the absolute target address, the offset target address, the contents of counter register 37, or the contents of a link register if the branch is resolved as taken. Branch unit 20 selects a particular one of the four possibilities depending upon the addressing: format of the branch instruction.

Branch unit 20 then determines how it will predict the same branch instruction the next time it executes the branch instruction, a step 78. Step 78 is more: fully described below in connection with FIG. 5. If branch unit 20 predicts that it will not take the branch instruction the next time it executes the branch instruction, then it determines if the branch instruction's decoded offset bit was asserted, a step 80. If the branch instruction was so marked, then branch unit 20 will delete the fetch address-target address pair corresponding to the branch instruction from BTAC 48, a step 82. (In this case, the branch instruction caused a target address to be stored in BTAC 48 during some previous time.) If the branch instruction's decoded offset bit was not asserted, then branch unit 20 will do nothing to BTAC 48. (In this case, the branch instruction does not have a target address stored in BTAC 48.) If branch unit 20 predicts that it will take the branch instruction the next time it executes the branch instruction, then it will add the fetch address-target address pair corresponding to the branch instruction to BTAC 48, a step 84. This methodology prevents branch unit 20 from deleting a valid entry from BTAC 48 because the BTAC entry maps to four instructions containing more than one branch instruction.

FIG. 5 depicts a flow diagram of step 78 depicted in FIG. 4. Branch unit 20 first determines if the branch instruction that it is executing is an unconditional branch instruction, a step 88. If the branch instruction that branch unit 20 is executing is an unconditional branch instruction, then branch unit 20 predicts (actually knows) that it will take the branch instruction the next time it executes the instruction. In this case, branch unit 20 adds the fetch address of the branch instruction and the target address which it calculated in step 76 to BTAC 48. If the branch instruction that branch unit 20 is executing is not an unconditional branch instruction, then branch unit 20 continues to determine what type of branch instruction it has just executed.

Branch unit 20 next determines if the branch instruction that it is executing is a conditional branch instruction, a step 90. As described above, conditional branch instructions depend upon one or more bits in condition register 39. Conditional branch instructions are predicted taken or not taken depending upon the value stored in BHT 50 corresponding to the fetch address of the conditional branch instruction. If the branch instruction that branch unit 20 is executing is a conditional branch instruction, then branch unit 20 calculates a new branch state for BHT 50, a step 92. Branch unit 20 also writes this new branch state to BHT 50 in step 92. Branch unit 20 determines if the new branch state is strong-taken or weak-taken, a step 94. A conditional branch instruction will be predicted taken in both of these cases the next time data processor 10 executes the conditional branch instruction. Therefore, branch unit 20 adds the fetch address of the branch instruction and the target address which it calculated in step 76 to BTAC 48. A conditional branch instruction that has a branch state corresponding to strong-not-taken or weak-not-taken will be predicted not taken the next time data processor 10 executes the conditional branch instruction. Therefore, branch unit 20 deletes the fetch address of the branch instruction and the target address which it calculated in step 76 from BTAC 48.

The branch instruction that branch unit 20 is executing must be based on the value of counter register 37 if the branch instruction is not an unconditional branch instruction nor a conditional branch instruction. As described above, branch unit 20 executes branch instructions that may branch if the value of counter register 37 equals zero or does not equal zero. Branch unit 20 determines if the counter-based branch instruction branches on the condition that the value of counter register 37 equals zero, a step 96.

If the counter register-based branch instruction branches on the condition that the value of counter register 37 is zero, then branch unit 20 determines if the present value of counter register 37 is one, a step 98. Branch unit 20 adds the fetch address of the branch instruction and the target address which it calculated in step 76 to BTAC 48 if the present value of counter register 37 is one. Branch unit 20 deletes the fetch address of the branch instruction and the target address which it calculated in step 76 from BTAC 48 if the present value of counter register 37 is not one. In the PowerPC Architecture, branch unit 20 decrements the value of counter register 37 at the beginning of the execution stage of each branch instruction. Then, branch unit 20 examines the value of counter register 37 as part of branch resolution. Therefore, if the value of counter register 37 is presently one, then the next branch instruction will cause the value of counter register 37 to equal zero. Branch unit 20 assumes that the branch instruction it is executing will also be the next branch instruction it executes. Therefore, the branch-taken requirement that the value of counter register 37 equal zero will be logically true if the present value of the counter is one. Similarly, the branch-taken requirement that the value of counter register 37 equal zero will be logically false if the present value of the counter is not one. (Alternately, branch unit 20 may assume that the value of counter register 37 is not equal to zero (or one) when it predicts whether each branch instruction will be taken or will not be taken the next time it encounters the branch instruction. Statistically, the value of counter register 37 is more often not equal to any particular number then is it equal to the particular number.)

If the counter register-based branch instruction branches on the condition that the value of counter register 37 is not zero, then branch unit 20 determines if the present value of counter register 37 is one, a step 100. Branch unit 20 adds the fetch address of the branch instruction and the target address which it calculated in step 76 to BTAC 48 if the present value of counter register 37 is not one. Branch unit 20 deletes the fetch address of the branch instruction and the target address which it calculated in step 76 from BTAC 48 if the present value of counter register 37 is one. In the PowerPC Architecture, branch unit 20 decrements the value of counter register 37 at the beginning of the execution stage of each branch instruction. Then, branch unit 20 examines the value of counter register 37 as part: of branch resolution. Therefore, if the value of counter register 37 is presently one, then the next branch instruction will cause the value of counter register 37 to equal zero. Branch unit 20 assumes that the branch instruction it is executing will also be the next branch instruction it executes. Therefore, the branch-taken requirement that the value of counter register 37 not equal zero will be logically false if the present value of the counter is one. Similarly, the branch-taken requirement that the value of counter register 37 not equal zero will be logically true if the present value of the counter is not one.

It should be noted that the prediction of whether each branch instruction will be taken or not taken the next time branch unit 20 executes it is not solely dependent upon the current resolution of the branch instruction. For instance, a conditional branch instruction could have a branch state equal to strong-taken due to its prior history or due to some start-up state. This branch instruction would be predicted taken during the decode stage of the instruction's pipeline cycle. However, it is possible that the condition on which this instruction is based could cause branch unit 18 to not take, the branch during the instruction's execution stage. The branch unit would correct the decode stage fetch address with a execution stage fetch address. Branch unit 20 would also modify the branch state of the branch instruction (step 92) to weak-taken. Branch unit 20 will predict that this conditional branch instruction should be taken the next time it executes the instruction, based on the weak-taken branch state. Therefore, branch unit 18 will add the fetch address-target address pair of this conditional branch instruction to BTAC 48.

Figure 6:
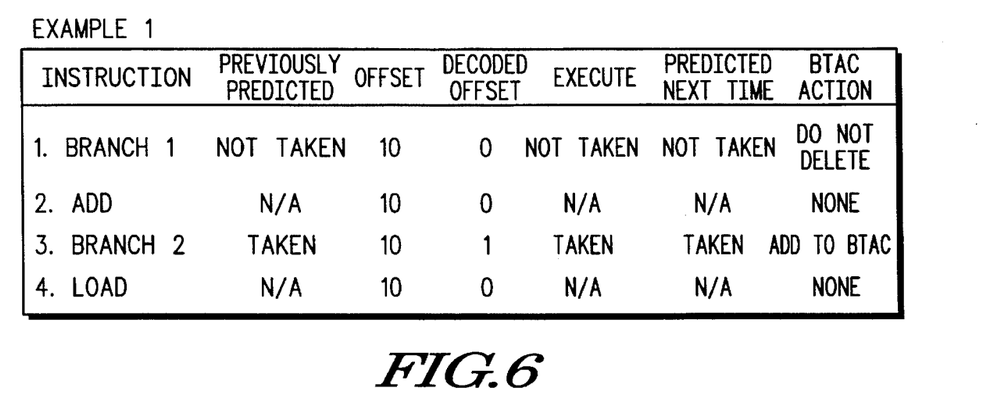
FIG. 6 depicts, in tabular form, a first example of the disclosed invention.

FIG. 6 depicts, in tabular form, a first example of the disclosed invention. In this first example, sequencer unit 18 fetches four instructions (operands omitted) in the same quad word: a first branch instruction, an add instruction, a second branch instruction, and a load instruction. Branch unit 20 predicted that it would not take branch instruction one and that it would take branch instruction two the previous time it executed these instructions. Therefore, the fetch address and the target address of the second branch instruction are stored in a particular entry of BTAC 48. BTAC 48 will output the target address of this entry to IFAR 44 causing instruction cache 14 to fetch instructions at the stored target address. The offset bits of this entry are "10," indicating that the third of four instructions generated the associated target address. Fetch logic unit 51 generates the four decoded offset bits "0010."

Continuing with the first example, branch unit 20 serially executes the first and second branch instructions. First, branch unit 20 determines that branch instruction one is, in fact, not to be taken. Therefore, no corrective action is necessary. Also, branch unit 20 predicts that branch instruction one will not be taken the next time it executes branch instruction one. Branch unit 20 does not delete the entry corresponding to the fetch address of these four instructions because the decoded offset bit of the first branch instruction is not asserted. Second, branch unit 20 determines that branch instruction two is, in fact, to be taken. Therefore, no corrective action is necessary. Also, branch unit 20 predicts that branch instruction two will be taken the next time it executes branch instruction two. Branch unit 20 adds the fetch address-target address of branch instruction two to BTAC 48. Branch unit 20 always adds the fetch address-target address of a branch instruction to BTAC 48 if it predicts that it will take the branch the next time it executes the branch instruction.

In this first example, branch unit 20 does not delete the entry corresponding to the fetch address of these first four instructions because the decoded offset bit of the first branch instruction is not asserted. This process avoids deleting a valid BTAC entry associated with the second branch instruction. If the first branch instruction had been predicted to be taken the next time branch unit 20 executed it, then branch unit 20 would have stored a new fetch address-target address-offset tag set in BTAC 48, overwriting the entry associated with the second branch instruction.

Figure 7:
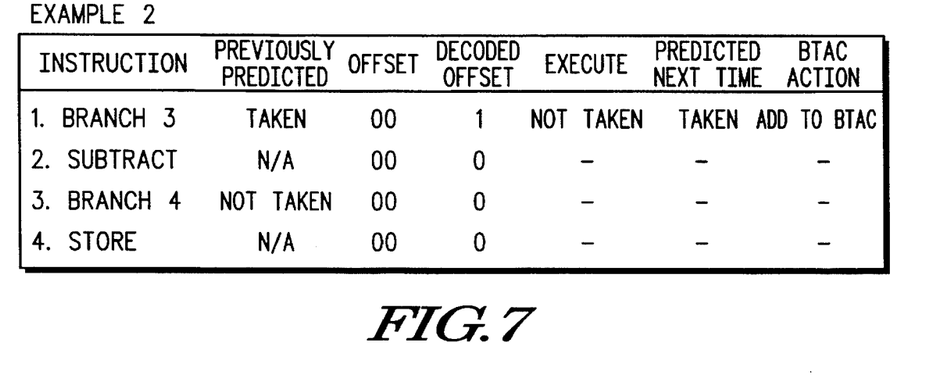
FIG. 7 depicts, in tabular form, a second example of the disclosed invention.

FIG. 7 depicts, in tabular form, a second example of the disclosed invention. In this second example, sequencer unit 18 fetches four instructions (operands omitted) in the same quad word: a third branch instruction, a subtract instruction, a fourth branch instruction, and a store instruction. Branch unit 20 predicted that it would take branch instruction three and that it would not take branch instruction four the previous time it executed these instructions. Therefore, the fetch address and the target address of the third branch instruction are stored in a particular entry of BTAC 48. BTAC 48 will immediately output the target address of this entry to IFAR 44 causing instruction cache 14 to fetch instructions at the target address. The second though fourth instructions in this example are then flushed from data processor 10. The offset bits of this entry are "00," indicating that the first of four instructions generated the associated target address. Fetch logic unit 51 will generate the four decoded offset bits "1000."

Continuing with the second example, branch unit 20 executes the third branch instruction. Branch unit 20 determines that branch instruction three is, in fact, not to be taken. Therefore, branch unit 20 outputs the sequential address associated with the third branch instruction to multiplexer 40, causing instruction cache 14 to immediately fetch instructors at the sequential address. Also, branch unit 20 predicts that branch instruction three will be taken the next time it executes branch instruction three. Branch unit 20 adds the fetch address-target address of branch instruction three to BTAC 48.

Figure 8:
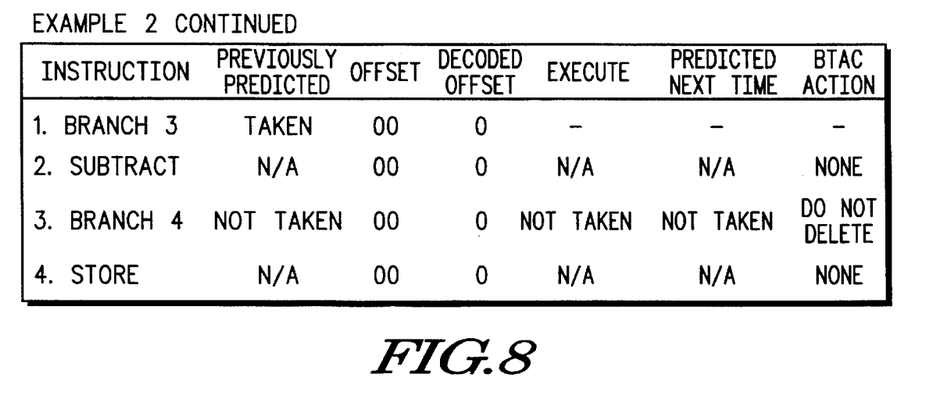
FIG. 8 depicts, in tabular form, a continuation of the second example depicted in FIG. 7.

FIG. 8 depicts, in tabular form, a continuation of the second example depicted in FIG. 7. Here, branch unit 20 has just output the corrective sequential address associated with the third branch instruction. Instruction cache 14 supplies the same four instructions to decode buffer 52. Again, the fetch address hits in BTAC 48 outputting the same target address as in FIG. 7. The offset bits of this entry are still "00," indicating that the first of four instructions generated the associated target address. However, fetch logic unit 51 does not assert QUALIFIED HIT/MISS because the offset is not within the range of the fetch address. Therefore, multiplexer 40 outputs the sequential address generated by sequential address calculator 46. Similarly, fetch logic unit 51 does not set the decode offset bit of the third branch instruction. Branch unit 20 does not execute the third branch instruction. Branch unit 20 does execute the fourth branch instruction, determining that the branch instruction is, in fact, not to be taken. Therefore, no additional corrective action is necessary. Also, branch unit 20 predicts that the fourth branch instruction will not be taken the next time it executes the instruction.

In this second example, branch unit 20 does not delete the entry corresponding to the fetch address of these second four instructions because the decoded offset bit of the fourth branch instruction is not asserted. This process avoids deleting a valid BTAC entry associated with the third branch instruction. If the fourth instruction had been predicted to be taken the next time branch unit 20 executed it, then branch unit 20 would have stored a new fetch address-target address-offset tag set in BTAC 48, overwriting the entry associated with the third branch instruction.

Although the present invention has been described with reference to a specific embodiment, further modifications and improvements will occur to those skilled in the art. For instance, the disclosed invention may be incorporated into data processors traditionally classified as complex instruction set computers or CISC machines. Certain functional units may be omitted in certain embodiments or relocated to other areas of data processor 10. Also, the disclosed BTAC update scheme may be incorporated into data processors that do not predict branch instructions as depicted in FIG. 5. It is to be understood therefore, that the invention encompasses all such modifications that do not depart from the spirit and scope of the invention as defined in the appended claims.

What is claimed is:

1. A data processor with branch target address cache, the data processor comprising;

the branch target address cache storing a plurality of sets, each one of the plurality of sets comprising a fetch address, a target address, and of offset tag, a concatenation of the fetch address and the offset tag indexing a first memory location storing a first branch instruction, the branch target address cache outputting a target address and an offset tag of a selected one of the plurality of sets if the fetch address of the selected one of the plurality of sets is logically equivalent to a first subset of an input address, the input address indexing a plurality of instructions, the data processor fetching an instruction indexed by the target address of the selected one of the plurality of sets;

a branch unit coupled to the branch target address, cache, the branch unit generating an execution fetch address responsive to one of the plurality of instruction, the one of the plurality of instructions associated with a second memory location, the branch unit deleting the selected one of the plurality of sets if the first and second memory locations are logically equivalent and if the execution fetch address is not equivalent to the fetch address of the selected set, the branch unit not deleting the selected one of the plurality of sets if the first and second memory locations are not logically equivalent.

2. The data processor of claim 1 wherein the branch unit stores the input address, the execution fetch address, and an offset tag in a set of the branch target address cache, the execution fetch address and the offset tag comprising a second memory address of the one of the plurality of instructions if the one of the plurality of instructions is a taken branch.

3. A method of operating a data processor comprising the steps of:

during a first time period, receiving a first input address of a first plurality of instructions in a branch target address cache;

first outputting a target address and an offset tag of a selected one of a plurality of sets if a fetch address of the selected one of the plurality of sets is logically equivalent to a first subset of the first input address, the data processor fetching an instruction indexed by the fetch address of the selected one of the plurality of sets, each one of the plurality of sets comprising a fetch address, a target address, and an offset tag, a concatenation of the target address and the offset tag of the selected one of the plurality of sets comprising a first memory address indexing a branch instruction;

during a second time period, receiving one of the first plurality of instructions in a branch unit coupled to the branch target address cache;

generating a first execution fetch address responsive to the one of the first plurality of instructions; and deleting the selected one of the plurality of sets if a memory location of the one of the plurality of instructions is logically equivalent to the first memory location and if the first execution fetch address is not equivalent to the fetch address of the selected set, but not deleting the selected of the plurality of sets if the first and second memory locations are not logically equivalent.

4. The method of claim 3 further comprising the steps of:

during a third time period, receiving a second input address of a second plurality of instructions in the branch target address cache;

during a fourth time period, receiving one of the second plurality of instructions in the branch unit coupled to the branch target address cache;

generating a second execution fetch address responsive to the one of the second plurality of instructions; and storing the second input address, the second execution and an offset tag in a set of the branch target address cache, the second input address and the offset tag comprising a second memory address of the one of the second plurality of instructions.

* * * * *